Jan. 30, 1968     B. A. WILDER     3,366,281

SPREADER APPARATUS AND DRIVE MECHANISM THEREFOR

Filed Nov. 21, 1966     2 Sheets-Sheet 1

Inventor
Buel A. Wilder
By
McCanna, Morsbach & Pillote
Attorneys

Jan. 30, 1968  B. A. WILDER  3,366,281
SPREADER APPARATUS AND DRIVE MECHANISM THEREFOR
Filed Nov. 21, 1966  2 Sheets-Sheet 2
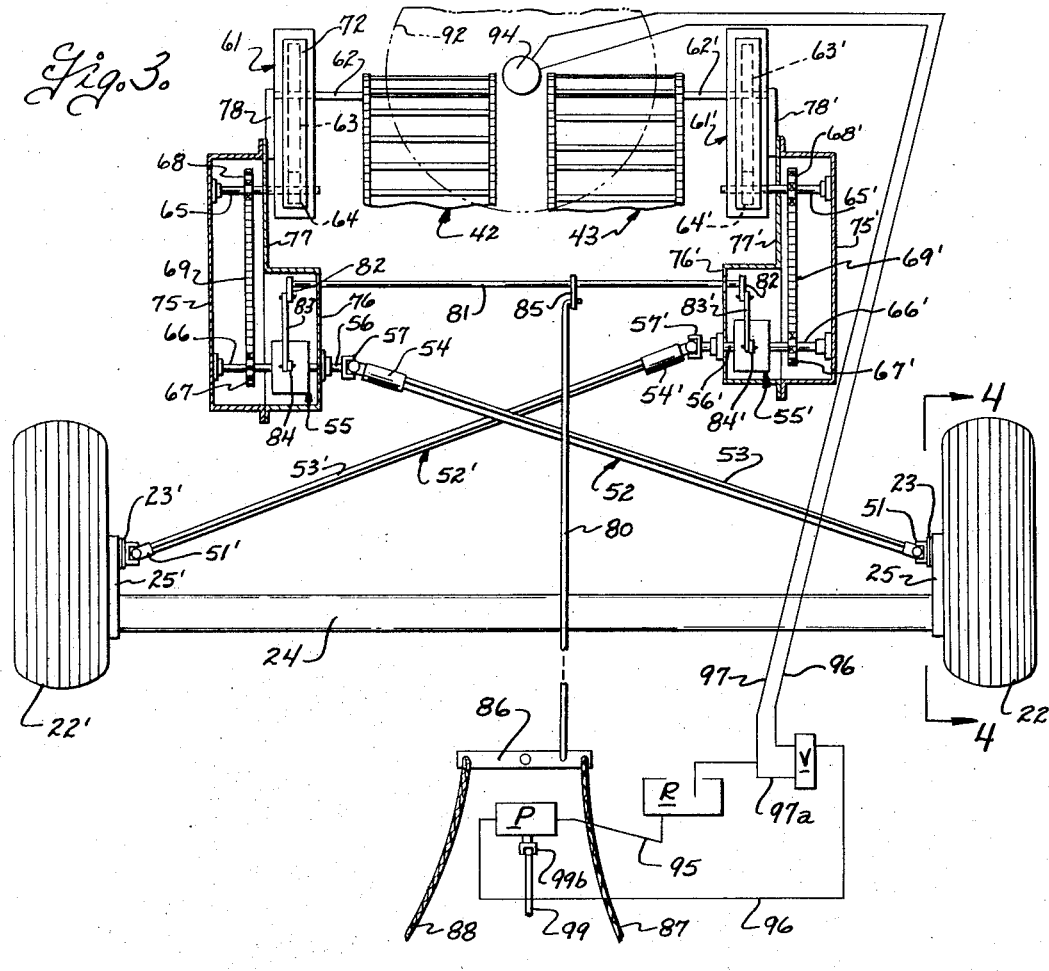
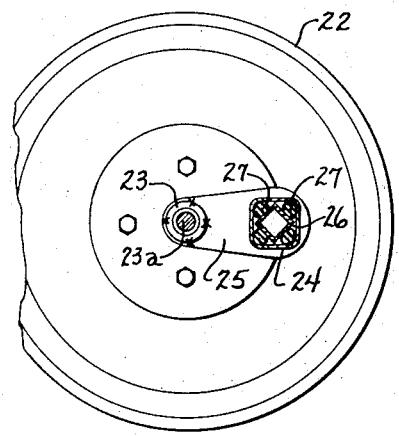
Inventor
Burl A. Wilder
By
McCanna, Morsbach & Pillote
Attorneys United States Patent Office 3,366,281
Patented Jan. 30, 1968

3,366,281
SPREADER APPARATUS AND DRIVE
MECHANISM THEREFOR
Burl A. Wilder, Lindenwood, Ill., assignor to Swenson Spreader & Mfg. Co., Lindenwood, Ill., a corporation of Illinois
Filed Nov. 21, 1966, Ser. No. 595,737
13 Claims. (Cl. 222—177)

This invention relates generally to improvements in apparatus for spreading materials on the ground, and particularly to an improved spreader apparatus and drive mechanism therefor.

It is an object of the present invention to provide a new and useful spreader apparatus usable over both smooth and rough terrain, but particularly adapted to the latter.

Another object, related to the foregoing, is to provide a spreader apparatus having individually suspended ground-engaging wheels.

It is another object of the present invention to provide a spreader apparatus having a unique drive mechanism for feeding material from a hopper.

Yet another object is to provide a spreader apparatus in accordance with the foregoing in which the drive mechanism is connected to the ground-engaging wheels.

Another object is to provide a drive mechanism in accordance with the foregoing object in which at least a portion of the drive mechanism is disposed inside a dust-proof enclosure.

Still another object is to provide a spreader apparatus including dual compartments and dual conveyors for feeding material therefrom and which conveyors are each driven by a new and useful drive mechanism connected to the wheel adjacent the side opposite the respective compartment.

It is another object of the present invention to provide a new and useful trailer-type spreader apparatus.

A further object of the present invention is to provide a trailer-type spreader apparatus having a drive mechanism connected to the ground-engaging wheels and which has a clutch remotely operable from the tractor.

Another object is to provide a trailer-type spreader apparatus having a rotary spreader and a self-contained hydraulic drive mechanism for driving the spreader.

A further object is to provide a spreader apparatus as in the foregoing object in which the pump for the hydraulic system is driven from the power-take-off of a tractor.

Other objects of the present invention are to provide a spreader apparatus which is economic, which can be used with various types of pulling vehicles, and which can simultaneously spread plural materials.

These, and other objects and advantages of the present invention, will become apparent as the same becomes better understood from the following detailed description when taken in conjunction with the accompanying drawings, wherein:

FIGURE 1 is a side elevational view of an embodiment of the present invention connected to a tractor;

FIG. 2 is a view taken generally along broken line 2—2 of FIG. 1;

FIG. 3 is a view on a larger scale than FIG. 2, in part sectional and in part diagrammatic, and showing the drive mechanism in detail; and FIG. 4 is a sectional view taken along line 4—4 of FIG. 3.

Reference is now made more particularly to the drawings which illustrate the best presently known mode of carrying out the invention and wherein similar reference characters indicate the same parts throughout the several views.

The apparatus of the present invention is preferably used with a trailing-type vehicle, generally designated 10, which is adapted to be towed as by a farm tractor, generally designated 12. The tractor preferably has a draw bar 13 and a power-take-off apparatus operatively connected to its motor and terminating in a shaft 14 adjacent the rear of the tractor and for a purpose which will hereinafter become apparent. It is contemplated, however, that various features of the present invention may be adapted for use with self-propelled vehicles such as trucks and the like.

The trailer 10 includes a frame having side members 16 and 17 and a longitudinally extending tow bar 18 conveniently having an opening 19 at the front end thereof for connection to draw bar 13 as by a pin 20. The frame is supported by a plurality of ground-engaging wheels 21, 31', 22 and 22'. It is preferable that there be at least two ground-engaging wheels and that they be independently suspended. In the embodiment illustrated, the rear wheels 22, 22' are rotatably mounted on tubular spindles 23, 23', respectively, in an arrangement known as a full-floating hub. The wheels are resiliently mounted for independent suspension, and the mounting includes a transverse shaft 24 rigidly secured to frame members 16 and 17 adjacent the rear ends thereof. As best shown in FIG. 2, the ends of the transverse shaft 24 are disposed outwardly of the frame, and radially projecting arms 25, 25' preferably extend rearwardly from the opposite ends thereof to provide mountings for the rotatable spindles. As shown in FIGS. 2–4, each spindle 23, 23' preferably extends through the rearwardly extending arms 25, 25' for a purpose to become apparent. There is advantageously provided an elastic joint between each arm 25, 25' and transverse member 24. As best shown in FIG. 4, member 24 is advantageously of square configuration for this purpose, and the joint includes an inner member 26 coaxially mounted within transverse or outer member 24. It will be noted that the sides of inner member 26 are normally disposed opposite the apices of the outer member 24. A plurality of cylinders 27 preferably made of elastic cushioning material are disposed between the inner member 26 and transverse member 24. Rotation of inner member 26 by virtue of vertical movement of arm 25 to which it is rigidly secured, will impart rolling movement to the cylinders 27 through an angle up to 45°. The elastic joint utilized in the present apparatus is that disclosed in Letters Patent No. 2,712,742 to Hermann J. Neidhart, and reference is made thereto for a more complete description.

It can be seen that the wheels 22, 22' are mounted for rotation about an axis offset from the axis of transverse member 24. This allows spindles 23, 23' to extend through the respective arms 25, 25' and provide a convenient connection for driving conveyors 42 and 43 as will hereinafter be described. Since the conveyors 42 and 43 are driven directly from wheels 22 and 22', in accordance with the present invention, it is preferable that the wheels always rotate relative to the speed of the vehicle. It is deemed obvious that the elastic joint described provides independent suspension of the wheels and that this is particularly advantageous when the vehicle is towed over rough ground. In this manner, the wheels will generally always be in contact with the ground and thus will generally always rotate as the vehicle is towed.

The front pair of supporting wheels 21, 21' are mounted in a similar fashion as wheels 22, 22', and including a transverse member 24a and rearwardly extending arms 25a, 25a'. In the embodiment shown, the various parts of the mounting and elastic joints are the same as described above and further description is deemed unnecessary. It is contemplated, however, that arms 25a, 25a' may extend forwardly from transverse member 24a, if desired, or that wheels 21, 21' be otherwise suspended or eliminated completely.

A hopper is mounted on the frame and is adapted to receive particulate materials such as fertilizer or the like. The hopper is herein illustrated as a generally V-box type having a generally open top and including longitudinal side walls 28 and 29 and end walls 32 and 33 connected to the side walls to define a generally rectangular box. Side walls 28 and 29 have downwardly inclined lower portions 34 and 35, respectively, which are reinforced by upstanding ribs 36.

The embodiment illustrated is particularly adapted to store and dispense different particulate materials from the hopper and, for this purpose, the hopper is divided into two compartments adjacent opposite sides of the vehicle by means of a longitudinal divider wall 38 extending between end walls 32 and 33 as shown in FIG. 2. Means is provided for discharging the materials from the several compartments and, preferably, the discharge is through an individual opening (not shown) in rear wall 32 leading to each compartment. These end walls may be advantageously provided with gates as is conventional, and further description is deemed unnecessary. For feeding material through the openings, it is possible to use a single conveyor which underlies both compartments; however, it is preferable to use separate rotary conveyors or feed means, such as shown at 42 and 43 for individually feeding the materials from the compartments. Conveyors 42 and 43 are conveniently of like construction and are herein shown of the endless type having spaced flights for advancing the material lengthwise of the compartments. As is conventional, plates or panels underlie the flights on the upper runs to support the material as it is advanced. It is contemplated that the conveyor or feed means may be of any construction, but they are advantageously adjacent the longitudinal center of the hopper but spaced from each other as best shown in FIG. 2. The bottom of the hopper includes a longitudinal portion covering the area between the conveyors and comprising members 46 and 47 slanting upwardly from each conveyor to divider wall 38.

The present invention provides a particularly advantageous drive mechanism for driving the feed means 42 and 43 at a speed correlative to the speed of the vehicle 10. In the embodiment illustrated, conveyor or feed means 42 at the right side of the vehicle is driven by wheel 22 adjacent the left side of the vehicle. For this purpose, a flexible coupling, conveniently in the form of a universal joint 51, is mounted at the back side of spindle 23 and attached to a drive shaft, generally designated 52. As shown in FIG. 4, a shaft 23a extends through tubular spindle 23 and is secured to a plate 22a (FIG. 1) for rotation as the wheel 22 rotates. Shaft 23a is attached to universal joint 51 and serves to transmit motion therethrough to drive shaft 52. The drive shaft 52 extends crosswise of the vehicle a preselected distance and includes an elongate portion 53 and a slip joint 54. The elongate portion 53 is advantageously of square cross-section as shown in FIG. 3 for driving slip joint 54 through engagement with the sides of the square portion 53. Slip joint 54 allows the portion 53 to slide longitudinally therein, thereby changing the effective length of the drive shaft 52 as necessitated by vertical movement of wheel 22 and spindle 23. Slip joint 54 is provided with a nipple (not shown) for lubrication of the joint and to assure that the longitudinal sliding may be easily accomplished. A clutching apparatus 55, conveniently of the mechanical type, is mounted adjacent the rear of the hopper (see FIG. 2) and adjacent slip joint 58. A shaft 56 is operatively connected to one side of the clutching apparatus 55 and extends therefrom to a second flexible coupling, such as universal joint 57, which is connected to slip joint 58. A second shaft 66 is operatively connected to the other side of the clutching apparatus 55 and extends therefrom. A sprocket 67 is mounted on shaft 66 for rotation therewith and a chain 69 leads from sprocket 67 to a second sprocket 68 secured to a shaft 65. A speed reduction apparatus, generally designated 61, is mounted on shaft 65 and a conveyor shaft 62 for driving the conveyor at a speed correlative to the rotation of wheel 22. The speed reduction apparatus 61 includes gear 63 secured to conveyor shaft 62 and gear 64 secured to shaft 65, which gears 63 and 64 provide a convenient 6-to-1 reduction.

In similar fashion, conveyor or feed means 43 at the left side of the vehicle is driven by wheel 22' adjacent the right side of the vehicle. The apparatus for accomplishing this is similar to that described above regarding conveyor 42, and similar parts are indicated on the drawings by the same number followed by the suffix prime ('). Accordingly, further description is deemed unnecessary.

Preferably, the speed reduction apparatus 61, the clutching apparatus 55, and the mechanism interconnecting the two are all enclosed in a dust-proof enclosure. This is particularly advantageous when the present invention is utilized for spreading fertilizer on tilled fields or other similar potentially dusty situations. As illustrated, speed reducer 61 is enclosed in a metal casing including portions 72 and 73 joined together along a medial flange as by bolts (not shown). The sprockets 67 and 68 and chain 69 are surrounded by a box-like casing 75, and the clutch 55 is disposed in a box-like casing 76. Casings 75 and 76 are joined together along a medial flange as by bolting, and a cover plate 77 serves to cover the remaining portion of casing 75. A plate 78 is disposed between cover plate 77 and the flanges of portions 72 and 73 to rigidly connect the various portions of the enclosure. As best shown in FIG. 2, box-like enclosure 76 is mounted on the side of the hopper and, as stated above, speed reducer 61 is mounted on conveyor shaft 62. In this manner, the enclosure and the elements therein are rigidly held in place. In similar fashion, speed reducer 61', clutch mechanism 55', and the mechanism interconnecting the two are enclosed in a separate dust-proof enclosure adjacent the other side of the hopper. Similar parts are designated by the same numbers followed by the suffix prime ('), and further description is deemed unnecessary. It will be noted, however, that box-like enclosures 75 and 76 are slightly larger than similar enclosures 75' and 76'. In this manner, shaft 56 is disposed forwardly of shaft 56'. This allows drive shafts 52 and 52' to cross without interference from each other.

Clutching mechanisms 55 and 55' are advantageously selectively operable from the tractor 12. For this purpose, a common shaft 81 extends crosswise of the vehicle and through the sides of enclosures 76 and 76'. Linkages 82–84 operatively connect shaft 81 to clutch apparatus 55 so that rotation of shaft 81 serves to operate the clutch. Similarly, linkage 82'–84' connects the other end of the shaft to clutching apparatus 55'. A longitudinally extending member 80 is connected to shaft 81 by means of a linkage 85 and is pivotally connected to a laterally extending bar 86. Bar 86 is advantageously pivotally mounted adjacent the front of tow bar 18 and a pair of flexible ropes 87 and 88 are connected at opposite ends of bar 86 and extend to a point adjacent the operator's seat on tractor 12. By pulling on one rope 87, the operator can engage clutches 55, 55' and disengage them by pulling on the other rope 88. It is contemplated that separate engaging means may be provided for each clutching apparatus for selective use of the two conveyors, if desired. It is also contemplated that other operating mechanisms may be used or that other types of clutches be employed other than mechanical clutches. The present apparatus, however, provides a particularly advantageous and simplified mechanism for remote operation of the clutches.

An exemplary use of the apparatus of the present invention is illustrated in the drawings. As shown, conveyors 42 and 43 dispense material to a common chute 91. The chute is conveniently arranged to guide the materials from the two compartments to a rotary spreader, such as broadcast spreader 92 of a type well known. Broadcast spreader 92 rotates about a generally upright axis, and material fed thereto is broadcast outwardly in the spreading operation. As illustrated, a separate drive mechanism is provided for driving the broadcast spreader 92. A hydraulic motor 94 is mounted adjacent the rear of the hopper for rotating the broadcast spreader 92 about its upright axis. A pump P is preferably mounted adjacent the front of the hopper for supplying fluid from a reservoir R to hydraulic motor 94. As shown, reservoir R is conveniently mounted on end wall 33 (see FIG. 1), and a conduit 95 extends therefrom to pump P. The pump supplies the fluid through a supply conduit 96 to motor 94, and a return conduit 97 leads therefrom back to reservoir R. A valve V is interposed in supply conduit 96 to regulate the flow of material therethrough and maintain a substantially constant speed of hydraulic motor 94 independent of the speed of pump P. For this purpose, valve V is preferably of the pressure compensated flow control type which bypasses the extra quantity of fluid as through a conduit 97a which leads to return conduit 97. The valve is advantageously of the type shown and described in detail in Letters Patent No. 3,113,784 issued to E. W. Swenson et al., and reference is made thereto for a more complete description. The aforementioned patent, however, contemplates that the pressure compensated valve be selectively adjustable to vary the spread pattern, if desired. While this same type of valve may be utilized in the present invention, it is contemplated that an advantageous spread pattern be preselected and that the speed of motor 94 be selected to achieve this pattern. As a result, the orifice setting of valve V may be set as at the factory and adjustment threafter is not necessary under usual circumstances. Pump P is of a size which will provide more than enough hydraulic fluid to valve V, even when operated at a minimum speed. In this manner, the speed of hydraulic motor 94 will be substantially constant independent of the speed of pump P because of the control provided by valve V. As indicated above, the speed of pump P may vary. This is a result of the preferred manner in which pump P is driven, that is from power-take-off shaft 14. As best shown in FIG. 1, a driven shaft 99 extends from p.t.o. shaft 14 to the pump drive shaft. Driven shaft 99 advantageously has flexible couplings in the form of universal joints 99a and 99b adjacent either end thereof, thereby providing a convenient means of coupling the pump to the power-take-off shaft which may be located at various positions on various types of tractors. The above-described drive apparatus for the broadcast spreader solves the problem of driving the broadcast spreader in a trailer-type spreader apparatus. The present invention provides an independent hydraulic system advantageously driven from the p.t.o. of a tractor. In this manner, there is no hydraulic connection, and hydraulic fluid from the tractor does not intermix with the fluid of the trailer.

It is now deemed obvious that the present invention provides a new and useful spreader apparatus and drive mechanisms for both the feed means and the broadcast spreader. Since the present apparatus is adapted for use over rough ground, the wheels are independently suspended, and this assures that the wheels will be rotated in various flexed positions. Thus, the wheels can be utilized to drive the conveyors correlative to the speed of the trailer, and this is done by the particularly advantageous apparatus above described. Preferably, the wheels are offset from the transverse shaft, and this allows a universal joint to be used for take-off of the rotation. In the apparatus described, each wheel serves to drive the conveyor for the compartment at the opposite side of the vehicle with the advantage of a simplified drive connection.

While a preferred embodiment of the invention has herein been illustrated and described, this has been done by way of illustration and not limitation, and the invention should not be limited except as required by the scope of the appended claims.

What is claimed is:

1. In an apparatus including a vehicle, means for propelling the vehicle, a hopper on the vehicle for holding material to be spread, and feed means for feeding material from the hopper at a rate correlative with the speed of the feed means, the improvement comprising:
a spindle, a ground-engaging wheel rotatably mounted on the spindle, means for resiliently mounting the spindle and wheel on the vehicle for independent suspension to allow independent vertical movement of said wheel and spindle, drive means including a drive shaft and flexible couplings, said drive means having one end operatively connected to the vertically movable wheel and the other end operatively connected to the feed means for driving the feed means responsive to rotation of the wheel whereby material is fed from the hopper at a rate correlative to the speed of the vehicle, clutch means interposed between the spindle and the feed means, and means for selectively operating the clutch means for selective discharge of material from the hopper.

2. An apparatus as set forth in claim 1 including a frame for supportnig the hopper, and wherein the operative connection for driving the feed means is adjacent the rear of the vehicle; wherein the means for resiliently mounting the spindle and wheel of the vehicle includes a transverse shaft rigidly mounted adjacent the rear of the frame and having first and second ends disposed outwardly of the frame, a radially projecting arm at the first end of the shaft and extending rearwardly therefrom and having means for mounting the spindle adjacent the rear end thereof, and means resiliently mounting the arm for limited rotation about the axis of said transverse shaft; and wherein one of said flexible couplings is operatively connected to the wheel and to the drive shaft, said drive shaft extending crosswise of the vehicle a preselected distance, and said frame terminating forwardly of the drive shaft thereby allowing movement of the drive shaft in response to vertical movement of the spindle about said transverse axis without interference by said frame.

3. An apparatus as set forth in claim 1 wherein the flexible couplings are at the ends of the drive shaft, one of said flexible couplings being operatively connected to the wheel and the other flexible coupling being operatively connected to the clutch means, said drive shaft including a sleeve and a rod slidably mounted in the sleeve whereby the length of the drive shaft is variable in response to vertical movement of the spindle.

4. An apparatus as set forth in claim 1 wherein one of said flexible couplings is operatively connected to the wheel and another of said flexible couplings is operatively connected to the clutch means, means including a speed reducer and connecting the clutch to the feed means for driving the feed means at a rate correlative to the speed of the vehicle, and dust-proof encasing means for enclosing said last-mentioned means and the clutch means.

5. An apparatus as set forth in claim 1 wherein: the vehicle is a trailer-type vehicle, the means for propelling the vehicle is a tractor having means for coupling to the trailer, and the means for selectively operating the clutch means includes a laterally extending bar pivotally mounted intermediate its ends and on the trailer at the end thereof adjacent the tractor, a longitudinally extending rigid member having one end pivotally connected to the bar and the other end disposed adjacent the clutch means, linkage means operatively connected to the member and to the clutch for operating the clutch in response to movement of the member, and flexible means attached to the bar and extending to the tractor for selective operation by an operator to pivot the bar and thereby operate the clutch.

6. An apparatus as set forth in claim 1 wherein: the hopper includes first and second compartments for holding first and second materials to be spread, the feed means includes first and second conveyor means each associated with one of said compartments for feeding the respective material therefrom, and the drive means operates for driving the first conveyor means; and including: a second spindle, a second ground-engaging wheel rotatably mounted on one end of the second spindle, means for resiliently mounting said second spindle and wheel on the vehicle for independent suspension thereof, and second drive means including a second drive shaft operatively connected to the second wheel and to the second conveyor means for driving the same responsive to rotation of the second wheel, whereby the material is fed from the second compartment correlative to the speed of the vehicle.

7. An apparatus as set forth in claim 6 wherein the wheels are adjacent opposite sides of the vehicle, the compartments extend longitudinally of the vehicle with the first compartment adjacent the same side as the second wheel and the second compartment adjacent the oppposite side, the second drive shaft extends crosswise of the vehicle a preselected distance to drive the second conveyor means associated with the second compartment at the opposite side of the vehicle, and the other drive shaft extends crosswise of the vehicle and past the second drive shaft to drive the first conveyor means, whereby rotation of each wheel feeds material from the compartment at the opposite side therefrom.

8. An apparatus as set forth in claim 7 including a frame for supporting the hopper, and wherein the operative connections to the first and second conveyors are adjacent the rear of the vehicle; wherein the means for resiliently mounting the spindles and wheels includes a transverse shaft rigidly mounted adjacent the rear of the frame and having first and second ends disposed outwardly of the frame, first and second radially projecting arms at the respective ends of the shaft and extending rearwardly therefrom and each having means for mounting the respective spindle adjacent the rear end thereof, means resiliently mounting each arm for limited rotation about the axis of said transverse shaft; each drive shaft having a flexible connection to its respective wheel; and said frame terminating forwardly of said drive shafts thereby allowing movement of the drive shafts in response to vertical movement of the respective spindles about said transverse axis without interference by the frame.

9. An apparatus as set forth in claim 8 wherein: the vehicle is a trailer-type vehicle having a draw bar at the front thereof; the means for propelling the vehicle is a tractor having means for coupling to the trailer draw bar and power-take-off means driven at a speed that varies with the speed of the tractor; and including a broadcast-type spreader mounted for rotation about a generally upright axis, a hydraulic motor adjacent the rear of the vehicle for rotating the spreader, conduit means connected to the hydraulic motor, a fixed displacement pump at the front of the trailer and connected to the conduit means for supplying fluid under pressure thereto, flexible coupling means for connecting the pump to the power-take-off means to drive the pump thereby at a speed that varies with the speed of the tractor, and flow control valve means in said conduit means for maintaining a preselected rate of flow of fluid therethrough and substantially independent of the speed of the pump.

10. An apparatus as set forth in claim 1 wherein: the vehicle is a trailer-type vehicle; the means for propelling the vehicle is a tractor having means for coupling to the trailer and power-take-off means driven at a speed that varies with the speed of the tractor; and including a broadcast-type spreader mounted for rotation about a generally upright axis, a hydraulic motor for rotating the spreader, conduit means connected to the hydraulic motor, a fixed displacement pump connected to the conduit means for supplying fluid under pressure thereto, flexible coupling means for connecting the pump to the power-take-off means to drive the pump thereby at a speed that varies with the speed of the tractor, and flow control valve means in said conduit means for maintaining a preselected rate of flow of fluid therethrough and substantially independent of the speed of the pump.

11. A trailer-type spreader apparatus for use with a tractor having a power-take-off means, said apparatus comprising: a frame, ground-engaging wheels on the frame, a hopper on the frame for holding a material to be spread, a rotary spreader at the rear of the hopper for spreading the material, a hydraulic motor at the rear of the hopper for driving the spreader, conduit means connected to the hydraulic motor, a hydraulic pump at the front of the hopper and connected to the conduit means for supplying fluid under pressure thereto, means for connecting the pump to the tractor power-take-off means to drive the pump at a speed that varies with the speed of the tractor, and flow control valve means in the conduit means for maintaining a preselected rate of flow of fluid therethrough substantially independent of the speed of the pump whereby the rotary spreader is rotated at a substantially constant speed.

12. A spreader apparatus as set forth in claim 11 including feed means for feeding the material from the hopper to the spreader, and means operatively connected to the feed means and to at least one wheel for driving the feed means correlative to the speed of the trailer.

13. A spreader apparatus as set forth in claim 12 wherein the ground-engaging wheels include first and second wheels mounted for rotation about a first axis and disposed adjacent opposite sides of the hopper, said wheels being resiliently mounted on the frame for limited movement about a second axis spaced from the first axis, and said last-mentioned means including a flexible coupling operatively connected to one of said wheels at the first axis, a drive shaft having one end connected to the flexible coupling, means operatively connecting the other end of the drive shaft to the feed means, and clutch means interposed between the drive shaft and the feed means for selective operation of the feed means.

References Cited
UNITED STATES PATENTS

| | | | |
|---|---|---|---|
| 2,506,911 | 5/1950 | Zeigler | 222—178 X |
| 3,125,345 | 3/1964 | Ellis | 222—178 X |
| 3,201,142 | 8/1965 | Dangauthier | 280—106.5 |

STANLEY H. TOLLBERG, *Primary Examiner.*